United States Patent Office 3,477,335
Patented Nov. 11, 1969

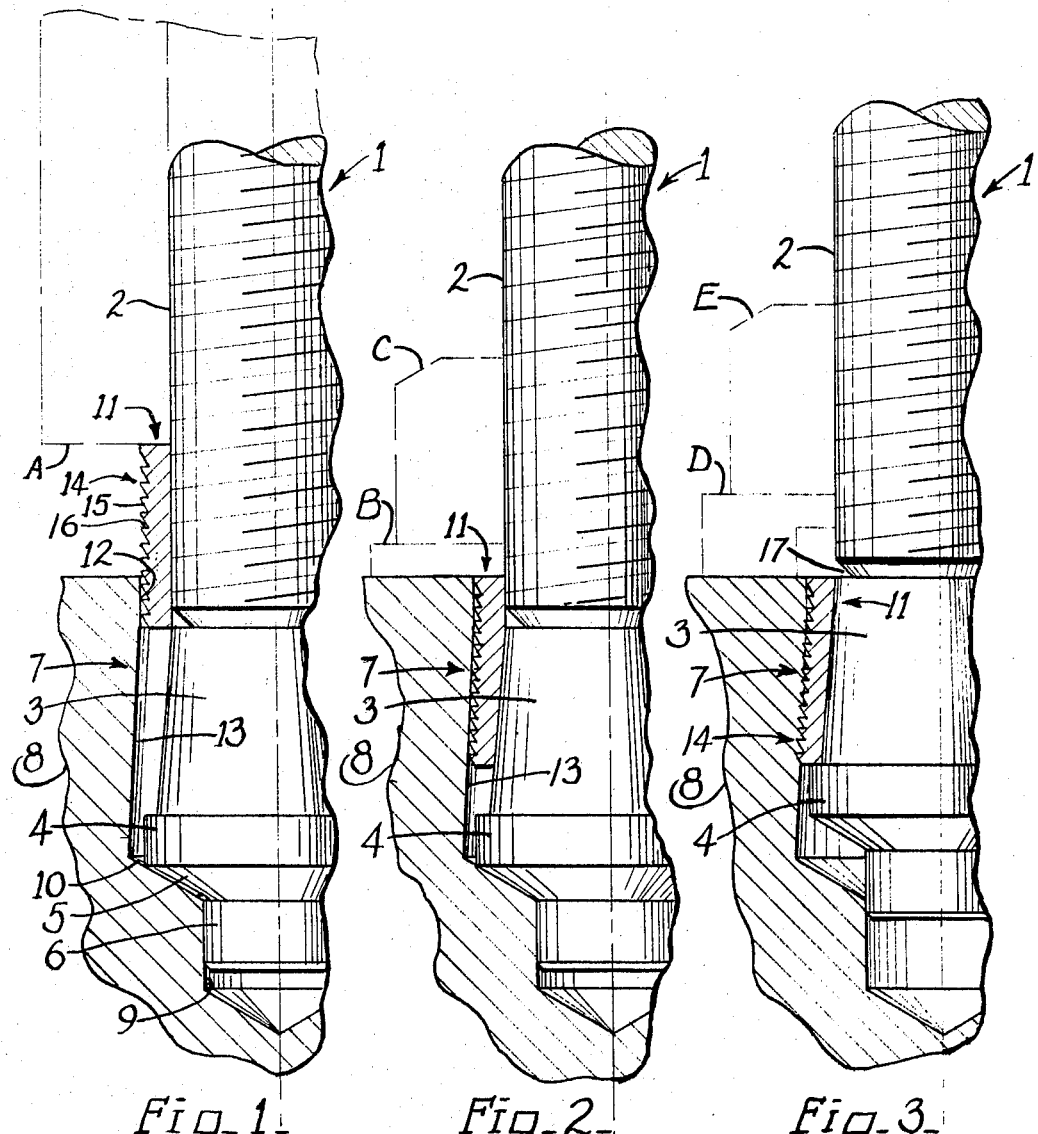

3,477,335
HIGH STRENGTH STUD OR INSERT
Harold Gold, 3645 Tolland Road, Shaker Heights, Ohio 44122, and Fred Macks, 5234 Willow Lane, Vermilion, Ohio 44089
Filed Jan. 31, 1968, Ser. No. 701,961
Int. Cl. F16b *31/02, 13/04, 33/04*
U.S. Cl. 85—62            5 Claims

ABSTRACT OF THE DISCLOSURE

A fastener assembly comprising a support structure, an insert member and a sleeve member. The support structure is provided with a specifically configurator aperture into which is inserted a correspondingly shaped insert. The insert is maintained in position by the expandable sleeve received in the aperture over a tapered portion of the insert.

Background of the invention

This invention has resulted from experiments performed on the pull-out strength of the stud anchors described in our copending application, Ser. No. 637,663, filed May 11, 1967. In anchors of the type described in the copending application a conical, dovetail-like lock is utilized. In this lock a sleeve member is expanded over an inwardly expanding conical mandrel at the inserted end of the stud and mates with a preformed, inwardly expanding, conical hole. Our experiments and analysis have shown that the simple conical-dovetail lock is not capable of resisting the ultimate load strength of a stud whose diameter is as large as the diameter of the conical mandrel. The small cone-angles to which this type of anchor is physically limited cause the production of stresses normal to the conical surface which are several times greater than the tensile stress in the stud. This stress magnification causes the conical locking sleeve to yield in lateral compression, or the hole to yield in lateral tension before the stud yields in tension.

This invention provides means whereby direct axial forces are developed by both the conical mandrel and the conical sleeve. The sum of these direct axial forces and the axial component of the normal force on the cone substantially exceeds the force that can be resisted by conical dovetail action alone. Accordingly, this invention greatly increases the load strength of the conical dovetail anchor.

Summary of the invention

In the basic embodiment of this invention a stud is anchored in a preformed, inwardly expanding, conical opening in a body by expanding a sleeve member over an inwardly expanding conical mandrel that is integral with the stud. The fundamental and important improvements provided by this invention lie in the annular, barb-like, gripping ridges that are provided on the outer surface of the sleeve member in combination with a cylindrical shoulder at the inner end of the conical mandrel. The ridges in the outer surface of the sleeve grip the wall of the hole to provide a direct axial force between the sleeve and the hole. The shoulder on the mandrel engages the inner end of the sleeve to provide a direct axial force between the mandrel and the sleeve.

In a modification of this invention the stud is provided with a section of reduced diameter at the intersection of the stud and the conical mandrel. The stud may then be loaded to tensile rupture at the section of reduced diameter. The rupture is proof of the minimum load strength of the remaining plug.

It is a principal object of this invention to provide means whereby the pull-out strength of a conical dovetail anchor can be sufficiently increased so that it is practical to employ the anchor to fasten high strength studs in bodies.

It is a further object to provide means and methods whereby a plug of verified internal pressure holding strength is achieved.

It is yet another object to provide a threaded insert of very high pull-out strength.

Brief description of the drawings

The description of the embodiments of this invention is taken in conjunction with the following accompanying drawings in which:

FIG. 1 is a fragmentary cross-sectional view of a body illustrating a stud in accordance with this invention in the first position of the process of anchoring the stud to the body; and, FIG. 2 is a cross-sectional view, as in FIG. 1, showing the second position of the members in the process; and, FIG. 3 is a cross-sectional view, as in FIG. 1, showing the final position of the members in the process;

Description of the preferred embodiments

Figure 4:
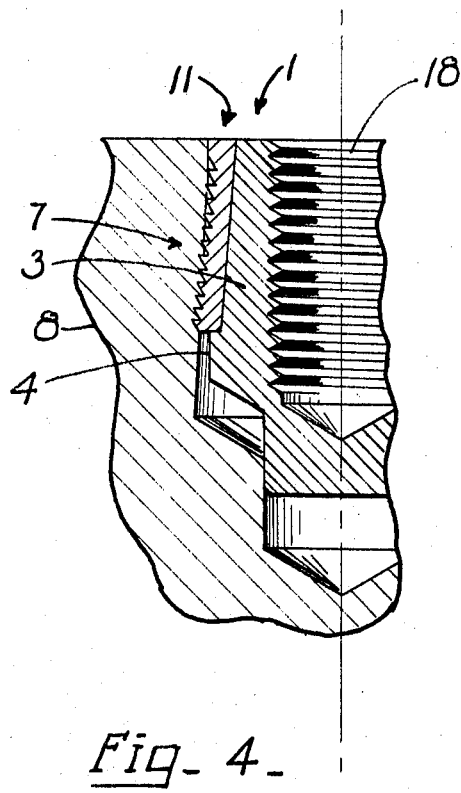
FIG. 4 is a cross-sectional view illustrating a threaded insert in accordance with this invention, showing the final position of the members in the anchoring process.

In FIG. 1 the stud member 1 comprises a threaded cylinder 2, conical mandrel 3, cylindrical collar 4, conical shoulder 5 and alignment pilot 6. In FIG. 1 stud member 1 is inserted in preformed, inwardly expanding, conical hole 7 in body 8. In this position pilot 6 nests in bore 9 of hole 7 and shoulder 5 rests against conical bottom 10 of hole 7. In FIG. 1 sleeve member 11 has been slipped over cylinder 2, rests at the start of conical mandrel 3 and nests in cylindrical entrance 12 of hole 7. Hole 7 includes inwardly expanding, conical bore 13 which entends from cylindrical entrance 12 to conical bottom 10. The annular ridges 14 in sleeve 11 have inward cones 15 and axially perpendicular walls 16. Tubular ram A, drawn in phantom in FIG. 1, slides freely over cylinder 2 and is employed to press sleeve 11 into hole 7 to the position illustrated in FIG. 2.

When pressed in, sleeve 11 is expanded into conical form by mandrel 3 and snugly fills the annular space beween bore 13 and mandrel 3, as illustrated in FIG. 2. The cone angle of mandrel 3 is made slightly greater than the cone angle of bore 13 to provide a substantially constant annular cross-sectional area between mandrel 3 and bore 13. Drawn in phantom in FIG. 2 are flat washer B and nut C, which are used in the installation process.

In the second step of the installation process stud 1 is partially drawn out of hole 7 by nut C while sleeve 11 is forced to remain flush with the top of hole 7 by washer B. The outward movement of stud 1 is limited by the engagement of collar 4 with sleeve 11, at which point nut C and washer B are removed. The installation of the stud is then complete, appearing as illustrated in FIG. 3.

The outward movement of stud 1 to the position illustrated in FIG. 3 causes a reduction of the annular space tween mandrel 3 and bores 13 and 12. This space reduction causes annular ridges 14 to engage the walls of bores 13 and 12 and function as barbs.

The installed stud, illustrated in FIG. 3, is anchored by the contact force between the cones, the shear force between sleeve 11 and bores 13 and 12 developed by the ridges 14, and the shear force on collar 4 developed by contact with sleeve 11. The summation of these three forces can be made greater than the rupture strength of a stud whose thread diameter is as large as the diameter of mandrel 3 at the plane of juncture (as is shown in the drawings). In tests of stud pull-out strength for stud member 1 and sleeve member 11 of steel and body 8 of aluminum alloy it has been found that stud anchors that are proportioned as shown in the drawings, and employing a cone angle of five (5) degrees on mandrel 3 and a cone angle of three and one-half degrees (3½) degrees in bore 13, hold beyond tensile rupture of cylinder 2. It has also been found in these tests that: (1) Elimination of ridges 14 results in pull-out of mandrel 3 and sleeve 11 through lateral expansion of bores 13 and 12; (2) Elimination of collar 4 results in pul-out of mandrel 3 through lateral expansion of sleeve 11 and bores 13 and 12; (3) Reduction of the cone angle of bore 13 results in pull-out of mandrel 3 and sleeve 11 through shearing off of the material of bore 13 that is engaged by ridges 14. The results of these experiments establish the requirement for a minimum cone angle for bore 13, for ridges on sleeve 11 and for collar 4.

It was stated previously (Background of the invention) that the type of anchor that is utilized in this invention is physically limited to small cone angles. This statement will be explained in the following paragraph.

It can be observed from the geometry of the configuration that the diameter of bore 12 must be equal to or larger than the diameter of collar 4 to permit entry of stud member 1 in hole 7. Therefore, as the cone angle of mandrel 3 is made larger the diameter of bore 12 and correspondingly the outer diameter of sleeve 11 must be equally increased. For a given material property the thickness of the wall of sleeve 11 is limited by the maximum insertion force that can be permitted, or by the capability of sleeve 11 to expand over mandrel 3 without rupturing. The length of mandrel 3 is limited by the same factors as is the cone angle. For this reason the length of sleeve 11 and correspondingly its wall gripping shear strength are limited. Through the use of the combined features of this invention a stud anchor of maximum pullout strength, minimum body hole diameter and depth is obtained.

Groove 17, shown in the drawings, is utilized when the anchor mechanism of this invention is used to provide a high pressure plug. After completion of the stud installation, as shown in FIG. 3, a counterbored washer D and a nut E are placed as drawn in phantom in FIG. 3. Nut E is then tightened until the stud ruptures at groove 17. The counterbore in washer D permits the pull-out force of the nut E to act without restricting outward motion of sleeve 11. From the known minimum cross-sectional area of groove 17 and the strength of the stud material the pullout force applied to the anchor may be computed. The minimum push-out fluid pressure can then be established without a hydrostatic test. Groove 17 is preferably shaped with the minimum cross-sectional area in a plane that is flush with the surface of body 8 so that the tested plug lies flush. The minimum cross-sectional area of groove 17 can be made as large as slightly less than the root diameter of the stud thread. On this basis an anchor, proportioned as shown in the drawings will provide, upon stud rupture, a certification of minimum containable internal pressure that is 55 percent of the tensile strength of the stud material. By way of example, a stud of mild steel, having a tensile strength of 60,000 p.s.i., will provide a plug, certified at installation to an internal pressure of 33,000 p.s.i.

As illustrated in FIG. 4, the system thus far described may be used to provide a threaded insert by eliminating cylinder 2 and providing a coaxial, threaded hole 18 in mandrel 3 that is open at the truncated end of the mandrel. A screw of sufficient length may be screwed into the threaded hole 18 to serve the function of cylinder 2 for installation purposes and the installation process that was previously described can be carried out. At the completion of the installation process the screw is removed and a threaded insert of very high pull-out strength is obtained.

The features of this invention, as have been described and shown on the drawings, are combined to achieve mechanical excellence in studs and inserts; however, where maximum performance is not required, certain simplifications may be made without departing from the scope of this invention. The loss of pull-out strength with the reduction or elimination of the inward expansion of bore 13, where functionally acceptable, may permit the machining simplification in forming hole 7. Where maximum squareness of the installed stud 1 with respect to hole 7 is not required, bore 9 and pilot 6 may be omitted. It will also be apparent to those skilled in the art that when minimum depth of hole 7 is desired, shoulder 5 and bottom 10 may be made flat and/or pilot 6 and hole 9 may be omitted.

It will also be apparent to those skilled in the art that devices other than nut C and washer B, and nut E and washer D, which are more suitable for production installation of the studs and/or inserts of this invention, may be employed.

We claim:
1. An assembly comprising a supporting member, an insert member and a sleeve member; said supporting member having an outwardly opening cavity, said insert member and said sleeve member being disposed in said cavity; said cavity being a coaxial array comprising in sequence: a cylindrical entrance bore, an inwardly expanding frusto-conical bore, an annular bottom shoulder, and a cylindrical pilot bore; the diameter of said pilot bore being less than the diameter of said entrance bore, the annular bottom shoulder being concave-conical; said insert member being a coaxial array comprising in order of insertion into said cavity: a pilot cylinder, a lower shoulder, a flange cylinder, a frusto-conical mandrel and a stud cylinder; said pilot cylinder mating with and being engaged in said pilot bore of said cavity, said lower shoulder mating and being in contact with said annular bottom shoulder of said cavity, the diameter of said flange cylinder being equal to or less than the diameter of said entrance bore of said cavity and being larger than the base diameter of said frusto-conical mandrel, an annular upper shoulder being thereby formed at the junction of said flange cylinder and said mandrel, said mandrel converging from said upper shoulder and smoothly joining said stud cylinder, tapering annulus of substantially constant transverse cross-section being formed between said mandrel and said conical bore of said cavity; said sleeve member being a cylinder having a coaxial cylindrical bore, said sleeve cylinder being a slip fit with said entrance bore of said cavity and said sleeve bore being a slip fit with said stud cylinder of said insert, said sleeve cylinder having barb-like annular ridges; said sleeve member being pressed into said tapering annulus and forming a snug fit therein; the axial length of said sleeve member being shorter than the depth from the surface of said supporting member to said annular upper shoulder of said insert member, so that with said sleeve member being pressed flush with the surface of said supporting member, a space is made to exist between said upper shoulder of said insert and the inner end of said sleeve member; said barb-like annular ridges of said sleeve member being driven into the wall of said conical bore of said cavity when said insert member is drawn outward through said sleeve member, said upper shoulder of said insert member being brought into contact with said inner end of said sleeve member by the same action; and said insert member having means for attaching a member thereto.

2. In the assembly of claim 1, said annular bottom shoulder of said cavity being flat.

3. An assembly according to claim 1 wherein said means for attaching a member thereto are threads on said stud cylinder of said insert member.

4. An assembly according to claim 1 wherein said insert member has a circumferential groove at the junction of said stud cylinder and said conical mandrel; said groove forming a section of minimum cross-sectional area in said stud cylinder, whereby said stud cylinder may be pulled to rupture at said groove, and accordingly the minimum pull-out strength of the assembly can be computed and a plug of known minimum blow-out strength is obtained.

5. An assembly according to claim 1 wherein said insert member terminates at the junction of said stud cylinder and said conical mandrel, and said insert member has a coaxial threaded hole.

References Cited

UNITED STATES PATENTS

| | | | |
|---|---|---|---|
| 494,745 | 4/1983 | Phillips | 85—77 |
| 1,560,095 | 11/1925 | Peirce | 85—74 |
| 1,713,640 | 5/1929 | Blanchard | 151—41.73 |
| 2,120,577 | 6/1938 | Schulte | 85—75 |
| 2,313,522 | 3/1943 | Dinnes | 85—74 |
| 2,466,546 | 4/1949 | Huelster | 151—41.73 |
| 3,073,627 | 1/1963 | Ritter | 287—20.3 |
| 3,175,455 | 3/1965 | Reddy | 85—75 |
| 3,198,231 | 8/1965 | Bisbing | 151—41.73 |
| 3,217,583 | 11/1965 | Fulop | 85—72 |

FOREIGN PATENTS

| | | |
|---|---|---|
| 1,297,330 | 5/1962 | France. |
| 1,435,507 | 3/1966 | France. |
| 542,203 | 1/1932 | Germany. |
| 719,547 | 4/1942 | Germany. |
| 596,275 | 12/1947 | Great Britain. |
| 1,010,802 | 11/1965 | Great Britain. |
| 66,286 | 8/1950 | Netherlands. |
| 118,613 | 4/1947 | Sweden. |
| 306,576 | 7/1955 | Switzerland. |

MARION PARSONS, Jr., Primary Examiner

U.S. Cl. X.R.

85—72, 74, 77, 79; 151—41.73; 287—20.3